United States Patent
Larsson

[11] Patent Number: 5,931,613
[45] Date of Patent: Aug. 3, 1999

[54] CUTTING INSERT AND TOOL HOLDER THEREFOR

[75] Inventor: Bernt Larsson, Sandviken, Sweden

[73] Assignee: Sandvik AB, Sandviken, Sweden

[21] Appl. No.: 09/034,395

[22] Filed: Mar. 4, 1998

[30] Foreign Application Priority Data

Mar. 5, 1997 [SE] Sweden .................................. 9700779

[51] Int. Cl.$^6$ .................................................. B23B 27/16
[52] U.S. Cl. .......................... 407/103; 407/107; 407/113
[58] Field of Search .............................. 407/66, 102, 103, 407/104, 113, 114, 115, 116, 107

[56] References Cited

U.S. PATENT DOCUMENTS

| | | |
|---|---|---|
| 2,140,941 | 12/1938 | Reaney . |
| 2,453,464 | 11/1948 | Sheridan . |
| 3,271,842 | 9/1966 | Breuning ................................ 407/103 |
| 3,299,491 | 1/1967 | Hall ........................................ 407/103 |
| 3,629,919 | 12/1971 | Trevarrow ............................... 407/103 |
| 5,810,518 | 9/1998 | Wilman et al. ......................... 407/102 |

*Primary Examiner*—Andrea L. Pitts
*Assistant Examiner*—Henry W.H. Tsai
*Attorney, Agent, or Firm*—Burns, Doane, Swecker & Mathis, L.L.P.

[57] ABSTRACT

A cutting insert for the chipforming machining of metals is mounted on a holder. A holding surface of the holder includes at least one rib extending in the longitudinal direction of the holder. The bottom surface of the insert includes at least one groove which receives the rib of the holder. The flanks of the rib and groove are inclined, whereby the insert is supported by those flanks. The bottom side of the insert further includes a transverse surfaces extending perpendicular to the groove and which are adapted to engage corresponding transverse surfaces of the holding surface, in order to resist longitudinal forces applied to the cutting insert.

6 Claims, 4 Drawing Sheets

Fig. 3
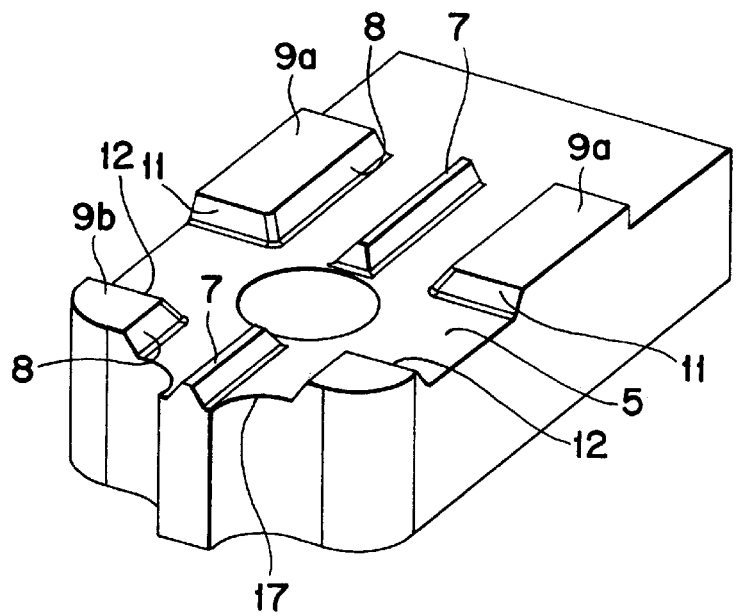
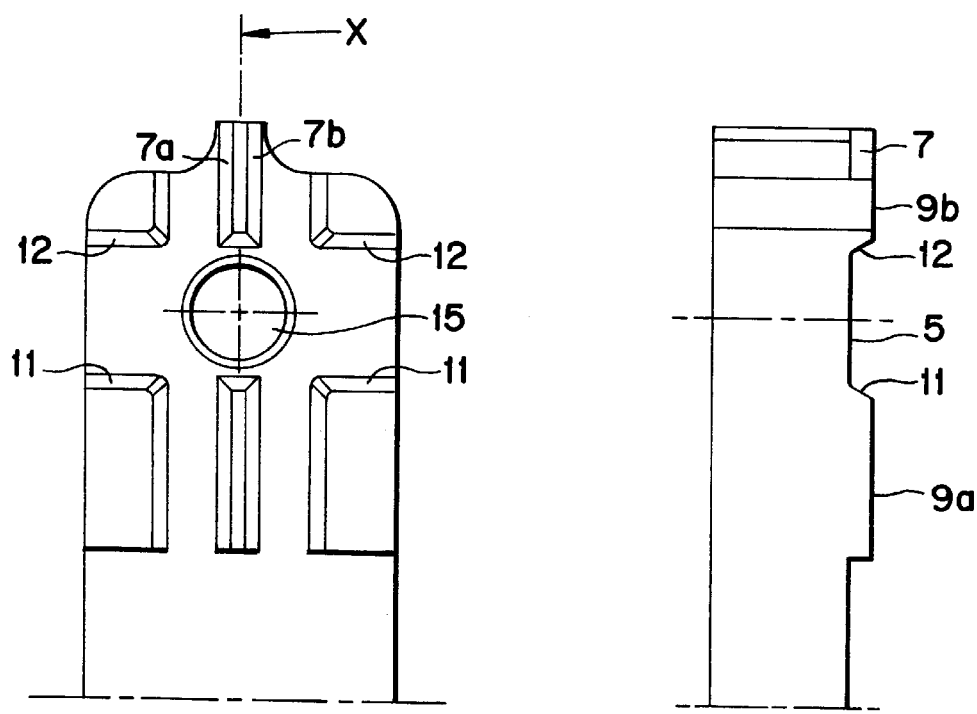
Fig. 4
Fig. 5

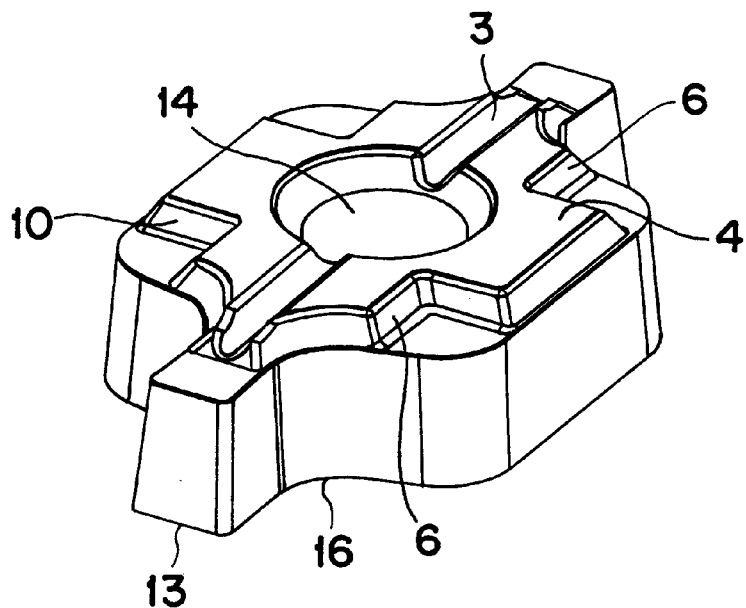
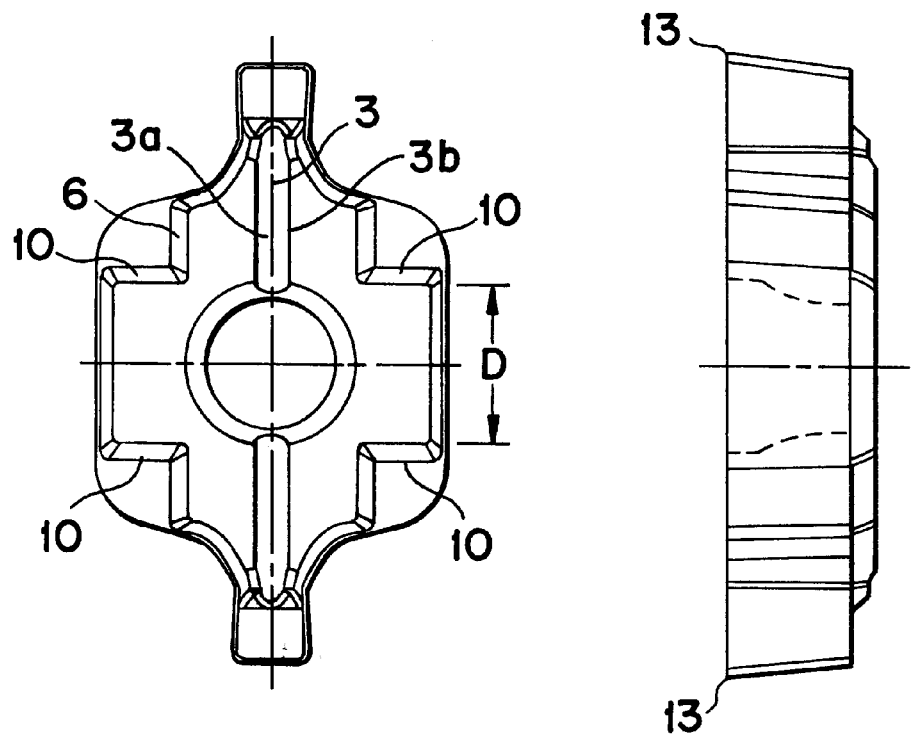

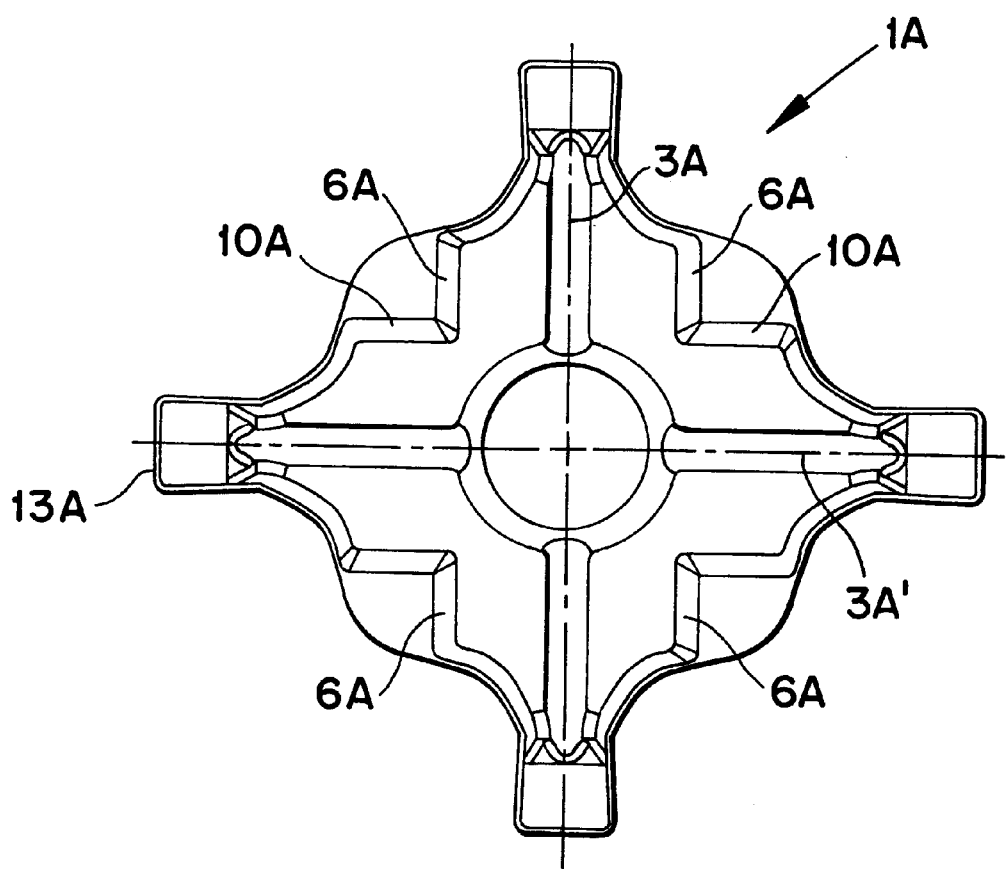

CUTTING INSERT AND TOOL HOLDER THEREFOR

BACKGROUND OF THE INVENTION

The present invention relates to an arrangement for the fastening of cutting inserts for the chip forming machining of metals.

Different cutting inserts and indexable inserts are fastened on tool holders in several different known ways. One of the most common is that the insert has a central through hole and the insert pocket in the holder has a threaded hole. A locking screw is inserted through the central hole of the insert and is screwed into the hole in the holder with a suitable torque. A shim with a center hole is often placed between the insert and the bottom support surface. Usually, the insert pocket also comprises two internal, substantially perpendicular abutment surfaces, or three abutment points, for abutting against two of the insert's side surfaces. The disadvantage with this design is that a certain amount of play can easily occur after a period of use. A further drawback is that the screw can easily be tightened excessively, thereby damaging the screw or causing it to break.

Other known insert holders have a clamp or similar fastening arrangement, which presses upon the upper surface of the insert in order to clamp it in the insert pocket. The clamping force can be regulated by a screw. Such designs may, for instance, be used to fasten cutting inserts which have no center hole, which is the case for, among others, grooving and parting inserts.

In order to avoid play and in general to attain a more stable fastening of a cutting insert, designs have been suggested according to which the lower surface of the cutting insert and the bottom support surface of the insert pocket have been formed as ribbed surfaces which are intended to match each other. Such designs are disclosed in U.S. Pat. Nos. 2,140,941 and 2,453,464. However, a drawback with these embodiments is that they necessitate a considerable amount of grinding of the ribbed surfaces of either the cutting insert or tool holder, or both. A further drawback is that, even if the insert has been secured in a direction perpendicular to the ribs by means of a stop face behind the insert, a vertical play can occur just as easily with these designs as with those with two completely planar abutment surfaces, particularly in machining operations with a tendency to vibration.

In addition, there are a number of disadvantages associated with the use of a stop surface for the insert behind said insert. For example, it is only possible to mount inserts which are precisely suited to the length in question. In addition the shape of such a stop surface must be adapted to the geometry of the insert. The stop surface must not, for example, damage the non-active cutting edge which faces away from the workpiece. Furthermore such a stop surface can, to a certain extent, limit the accessibility of the insert and holder to the workpiece.

A system for clamping inserts on a holder is described in WO-A-95/29026, which is so arranged that it includes parallel grooves on the underside of the insert and ribs on the holder, whereby the ribs fit into the grooves. The insert is screwed fast in the holder, whereby a wedge action is created between the ribs and grooves. This wedge action and the friction between the flank surfaces of the ribs and grooves stabilize the insert to a significant degree in a radial direction (i.e., along a longitudinal axis of the holder which is oriented perpendicular to an axis of rotation of a workpiece), but when cutting forces are large this clamping action is not entirely reliable, and for this reason a rear stop surface must be utilized on occasions.

Thus a primary object of the present invention is to design a clamping system comprising an insert and a holder so that the use of a rear stop surface can be avoided.

A secondary object of the present invention is to design a clamping system in such a way that, the same holder can receive several inserts with different basic geometries.

A third object of the invention is to optimize the accessibility of the insert and holder with regard to the workpiece.

A further object of the invention is to design a clamping system which can in an optimal manner absorb both radial and axial cutting forces.

SUMMARY OF THE INVENTION

These and other objects have been achieved by the combination of an insert holder and an insert mounted thereon for the chipforming machining of metal. The holder includes an upper holding surface defining a longitudinal axis and having at least one upstanding rib extending substantially parallel to the longitudinal axis. The insert is mounted adjacent a front edge of the holding surface and includes a bottom surface having at least one groove receiving the at least one rib. The groove defines main longitudinal support surfaces, and the rib defines secondary longitudinal support surfaces engaging the primary longitudinal support surfaces. The bottom surface of the insert further includes primary transverse support surfaces extending transversely relative to the at least one groove and facing away from the front edge of the holding surface. The holding surface includes secondary transverse support surfaces extending transversely relative to the rib while facing toward the front edge and engaging respective ones of the primary transverse support surfaces for resisting longitudinal forces acting on the insert.

The invention also pertains to a cutting insert for chipforming metal machining, comprising a top surface having a cutting edge and a bottom surface having at least one groove formed therein and a plurality of transverse supporting surfaces extending transversely of the groove.

Brief Description of the Drawing

The objects and advantages of the invention will become apparent from the following detailed description of a preferred embodiment thereof in connection with the accompanying drawing in which like numerals designate like elements, and in which:

FIG. 3 shows a holder according to FIGS. 1 and 2 separately without insert, in perspective obliquely from above.

FIG. 4 shows the holder according to FIG. 3 straight from above.

FIG. 5 shows a side elevational view of the holder according to FIG. 3.

FIG. 6 shows an insert in accordance with the invention, in perspective obliquely from below.

FIG. 7 shows the insert according to FIG. 6, straight from below.

FIG. 8 shows a side elevational view of the insert according to FIG. 6, straight from the side.

FIG. 9 shows another insert according to the invention, straight from below.

DETAILED DESCRIPTION OF PREFERRED EMBODIMENTS OF THE INVENTION

Figure 1:
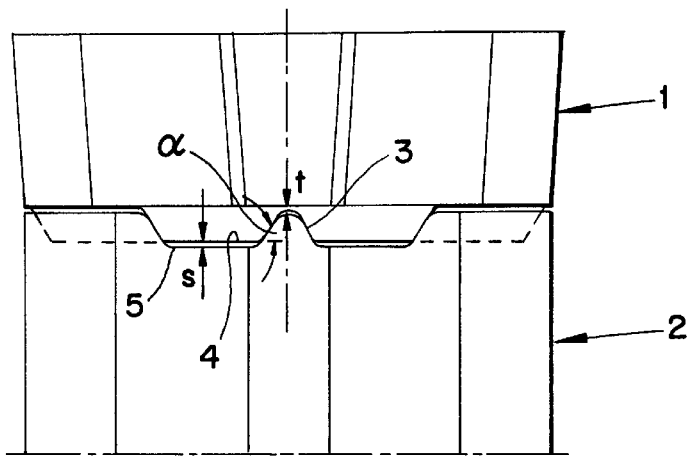
FIG. 1 shows a side elevational view of an insert and a holder in accordance with the invention.
Figure 2:
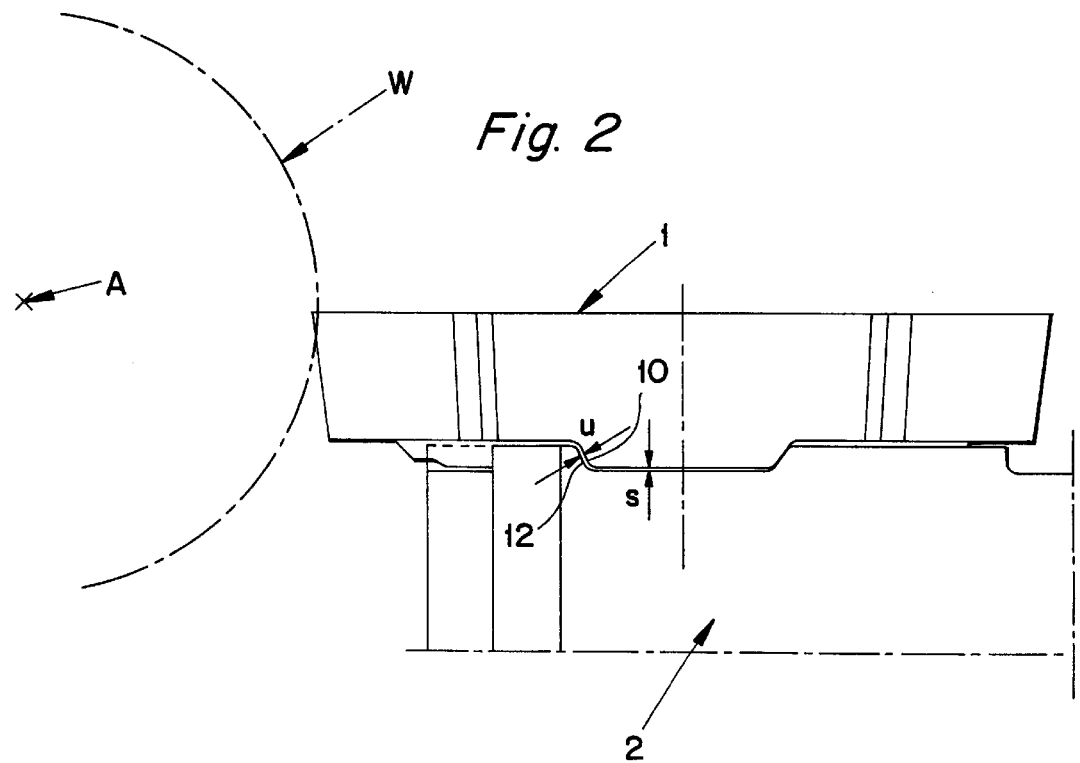
FIG. 2 shows another side elevational view of the insert and holder according to FIG. 1.

In FIGS. 1 and 2 an insert is designated in general by 1 and a holder in general by 2. The holder 2 has a longitudinal axis X (FIG. 4) which extends substantially perpendicular to an axis A of a workpiece W (see FIG. 2). The cutting insert is, in most cases, manufactured in coated or uncoated cemented carbide. The geometry of the cutting inserts basic shape is not an essential characterization of the invention, not least of all because one of the main aims of the invention is that inserts of different geometry can be assembled in the same holder. Characteristic for all the cutting inserts according to the invention is however, that they feature one or several grooves 3, the flank sides 3a, 3b, of which act as primary longitudinal supporting surfaces for engaging secondary longitudinal supporting surfaces 7a, 7b, of an equivalent number of ribs 7. The groove extends mainly in the longitudinal direction of the holder 2, i.e., mainly perpendicular to the workpiece's axis of rotation. In FIG. 6 an insert is shown with only one groove 3, but the insert could have several parallel grooves (and the holder an equivalent number of ribs), as described in Publication WO-A-95/29026, which is incorporated herein by reference. A substantially planar bottom surface 4 connects to the two edges of the groove 3, which surface 4 when in the assembled condition forms a gap "s" (see FIGS. 1 and 2) with the opposite, substantially planar holding surface 5, of the holder. The gap "s" can suitably be between 0.02 and 0.03 mm.

The planar surface 4 is bordered by, among things, four side flanks 6, which extend mainly parallel to the groove 3. In the same way as the flank surfaces of the grooves 3a, 3b, these flank surfaces 6, also act as support surfaces for engaging corresponding support surfaces 8 of the insert holder, which form flank surfaces for the raised parts 9a, 9b, of the holder.

An important characteristic of the invention in question involves preventing the insert from being displaced in a radial direction of the workpiece W, i.e., a direction parallel to the axis X, which is achieved by providing, on the insert, primary transverse supporting surfaces 10, which are arranged substantially parallel to the workpiece axis A and substantially perpendicular to the grooves 3 and the flanks 6. The support surfaces 10 are intended to bear against opposite surfaces 11 secondary transverse supporting surfaces 11 of the raised portions 9a on the tool holder. The surfaces 11 face toward a front edge 17 of the holder. The surfaces 12 on the raised parts 9b, are however not intended to function as support surfaces, as illustrated by the gap "u" in FIG. 2. The distance D between the flanks 10 is accordingly somewhat narrower than the width of the equivalent groove between flank surfaces 11 and 12. A suitable value for the gap "u" is between 0.05 and 1 mm.

The surfaces 3a, 3b, 6 and 10 are inclined by an oblique angle so as to face downwardly, and the surfaces 7a, 7b, 8 and 11 are inclined by the same angle to face upwardly. When the insert is mounted, it will consequently only rest against the surfaces 7a, 7b, 8 and 11 of the holder. No contact occurs between the top of the rib and the bottom of the groove as represented by gap "t" in FIG. 1. Suitable values for the oblique angle α formed by each of the flank surfaces 7a, 7b, (or each of the flanks 3a, 3b) relative to the bottom surface 5 (and thus also relative to the holding surface) are between 50° and 70°, preferably between 55° and 65°.

Accordingly, since there occurs no contact between the top of the rib 7 and the bottom of the groove 3, a clamping wedge action between the rib and groove becomes possible. In addition a slight surface roughness of the direct pressed ribs has a positive effect on the clamping function.

The insert illustrated in FIGS. 6–8 features two operative cutting edges 13. After a cutting edge has been worn out the insert can be loosened and turned half a revolution in order to index the other cutting edge to a cutting position. The insert is clamped in the holder with the help of a locking screw (not shown), which is fed through the smooth hole 14, and screwed tight into the threaded hole 15 in the holder. The hole 14 divides the groove 3 into spaced groove segments, and the hole 15 divides the rib 7 into spaced rib segments. When the insert is indexed, its other two flanks 10, will act as support surfaces against the holder's support surfaces 11. As can be seen from FIGS. 3 and 4, the threaded hole 15 in the holder is bisected by the axis of the rib 7. The reason for placing the holes 14, 15 in intersecting relationship to the groove 3 and rib 7 instead of, for example, between two ribs, is because the insert could break if it was exposed to a force between the two support lines. In cases where the insert has several ribs 7, each of the insert and holder is designed with an uneven number of grooves and ribs, in order to impart a symmetrical clamping force on the insert on both sides of the central rib.

In order to improve the cutting economy when machining with inserts according to this invention an insert 1A could have a design with four operative cutting edges 13A, as shown in FIG. 9. This insert can rest against the same holder 2 shown in FIGS. 3–5 in the same way as the insert as shown in FIGS. 6–8. The groove 3A will accept the rib 7 of the holder while another groove 3A' which is at right angles to the groove 3A will be empty and open against the bottom surface 5 of the holder. A couple of the flank surfaces 10A will function as support surfaces against the support surfaces 11 of the holder, whilst the four flank surfaces 6A, will act as support surfaces against surfaces 8 of the insert holder. When the insert is indexed a quarter turn, surfaces 6A, and 10A will change places with other surfaces 6A and 10A, and groove 3A' will accept rib 7.

A number of advantages have been obtained via the axially aligned, interactive support surfaces 10 and 11. The size and shape of different inserts need not have an influence on the design of the holder since the holder need not include a rear support surface for the insert. In other words one obtains a greater degree of freedom when designing an insert. With these inserts it can also be difficult to design a functionally acceptable support surface, for example because of the different radial reliefs. In addition the holders can be given a more pliant and slimmer design, without any abutment surfaces behind the insert.

As has been mentioned above, an insert according to the invention. in question is well equipped to resist both axial and radial forces. Bearing this in mind, it should be pointed out finally that advantage can be taken of this by designing double functional inserts in accordance with FIGS. 6–8. Because of the straight cutting edge 13 and the curved side edges 16, which border both sides of the cutting edge, this insert can be used for facing and even for axial copying, plus use for the turning of radii. Hence a large number of different contours can be generated.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. In combination, an insert holder and insert mounted thereon for the chipforming machining of metal, the holder including an upper holding surface defining a longitudinal axis and having at least one upstanding rib extending substantially parallel to the longitudinal axis; the insert mounted adjacent a front edge of the holder surface and including a bottom surface having at least one groove receiving the at least one rib; the groove defining primary longitudinal support surfaces, and the rib defining secondary longitudinal support surfaces engaging the primary longitudinal support surfaces; the bottom surface of the insert further including primary transverse support surfaces extending transversely relative to the at least one groove and facing away from the front edge of the holding surface; the holding surface including secondary transverse support surfaces extending transversely relative to the rib while facing toward the front edge and engaging respective ones of the primary transverse support surfaces for resisting longitudinal forces acting on the insert; the primary and secondary longitudinal and transverse support surfaces being oriented at corresponding oblique angles relative to the holding surface such that the primary longitudinal and transverse support surfaces face downwardly and rest upon the secondary longitudinal and transverse support surfaces, respectively, the oblique angle being in the range of 50°–70°.

2. The combination according to claim 1 wherein the insert further includes primary side flank surfaces facing away from the at least one groove and extending substantially parallel to the longitudinal axis; the holder including secondary side flank surfaces facing toward the rib; the primary and secondary side flank surfaces oriented at corresponding oblique angles with respect to the holding surfaces such that the primary side flank surfaces face downwardly and rest upon the secondary side flank surfaces which face upwardly.

3. The combination according to claim 2 wherein the only contact between the insert and holder occurs along the primary and secondary longitudinal support surfaces, the primary and secondary transverse support surface, and the primary and secondary side flank surfaces.

4. The combination according to claim 1 wherein the insert includes a through-hole for receiving a fastening screw, the fastening hole passing through the groove and dividing the groove into spaced-apart groove segments, the holder including a threaded hole passing through the rib and dividing the rib into spaced-apart rib segments.

5. In combination, an insert holder and insert mounted thereon for the chipforming machining of metal, the holder including an upper holder surface defining a longitudinal axis and having at least one upstanding rib extending substantially parallel to the longitudinal axis; the insert mounted adjacent a front edge of the holding surface and including a bottom surface having at least one groove receiving the at least one rib; the groove defining primary longitudinal support surfaces, and the rib defining secondary longitudinal support surfaces engaging the primary longitudinal support surfaces; the bottom surface of the insert further including primary transverse support surfaces extending transversely relative to the at least one groove and facing away from the front edge of the holding surface; the holding surface including secondary transverse support surfaces extending transversely relative to the rib while facing toward the front edge and engaging respective ones of the primary transverse support surfaces for resisting longitudinal forces acting on the insert; the inset including a throughhole for receiving a fastening screw, the fastening hole passing through the groove and dividing the groove into spaced-apart groove segments, the holder including a threaded hole passing through the rib and dividing the rib into spaced-apart rib segments.

6. In combination, an insert holder and insert mounted thereon for the chipforming machining of metal, the holder including an upper holding surface defining a longitudinal axis and having at least one upstanding rib extending substantially parallel to the longitudinal axis;

the insert mounted adjacent a front edge of the holding surface and including a bottom surface having at least one groove receiving the at least one rib; the groove defining primary longitudinal support surfaces, and the rib defining secondary longitudinal support surfaces extending parallel to and engaging the primary longitudinal support surfaces;

the bottom surface further including primary side flank surfaces spaced transversely from the at least one rib and extending substantially parallel to the longitudinal axis; the holding surface including secondary side flank surfaces extending parallel to and engaging the primary side flank surfaces;

the bottom surface further including primary transverse support surfaces extending transversely relative to the at least one groove and facing away from the front edge of the holding surface; the holding surface including secondary transverse support surfaces extending transversely relative to the rib while facing toward the front edge, the secondary transverse support surfaces extending parallel to and engaging respective ones of the primary transverse support surfaces for resisting longitudinal forces acting on the insert;

the primary and secondary longitudinal support surfaces being inclined at corresponding oblique angles relative to the holding surface such that the inclined primary longitudinal support surfaces face downwardly and rest upon the secondary longitudinal support surfaces which face upwardly;

the primary and secondary side flank surfaces being inclined at corresponding oblique angles relative to the holding surface such that the primary side flank surfaces face downwardly and rest upon the secondary side flank surfaces which face upwardly;

the primary and secondary transverse support surfaces being inclined at corresponding oblique angles relative to the holding surface such that the primary transverse support surfaces face downwardly and rest upon the secondary transverse support surfaces which face upwardly;

the contact between the inclined primary and secondary longitudinal support surfaces, between the inclined primary and secondary side flank surfaces, and between the inclined primary and secondary transverse support surfaces defining the sole contact between the insert and the holder.

* * * * *